United States Patent [19]

Malburg et al.

[11] 4,257,012
[45] Mar. 17, 1981

[54] NOZZLE ASSEMBLY FOR GAS-DYNAMIC HIGH EFFICIENCY LASERS

[75] Inventors: Werner Malburg, Neubiberg; Friedbert Mohr, Zorneding, both of Fed. Rep. of Germany

[73] Assignee: Messerschmitt-Boelkow-Blohm Gesellschaft mit beschraenkter Haftung, Munich, Fed. Rep. of Germany

[21] Appl. No.: 945,832

[22] Filed: Sep. 26, 1978

[30] Foreign Application Priority Data

Oct. 6, 1977 [DE] Fed. Rep. of Germany ....... 2745001

[51] Int. Cl.³ .............................................. H01S 3/02
[52] U.S. Cl. .............................. 331/94.5 D; 239/132.3; 239/555
[58] Field of Search ................... 331/94.5 G, 94.5 D, 331/94.5 P; 239/132.3, 554, 555, 557

[56] References Cited

U.S. PATENT DOCUMENTS

| 3,602,432 | 8/1971 | Mulready | 239/555 X |
| 3,819,321 | 6/1974 | Witt | 239/555 X |
| 4,161,285 | 7/1979 | Matheny et al. | 239/555 X |

*Primary Examiner*—James W. Davie
*Attorney, Agent, or Firm*—W. G. Fasse; D. F. Gould

[57] ABSTRACT

The present nozzle assembly for gas-dynamic high efficiency lasers with a cooling system comprises a plurality of specially formed nozzle members or so-called lamellae. Each nozzle has its own cooling passages, matching bodies and glide surfaces. A series of nozzle members are placed in thermal contact with each other within a mounting or holding block. A coolant flows through said cooling passages which extend through each nozzle throat region and through matching bodies of the nozzle members so that a uniform temperature prevails across the nozzle assembly whereby the nozzle dimensions are maintained constant especially at the nozzle throat width and whereby leakage flows are eliminated.

10 Claims, 5 Drawing Figures

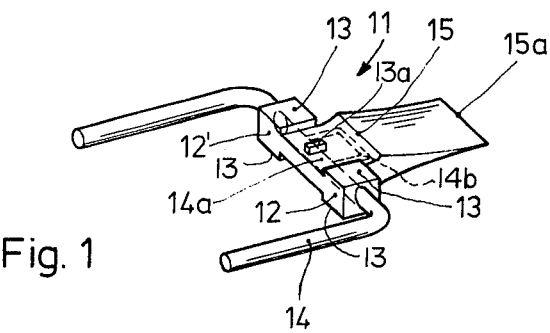
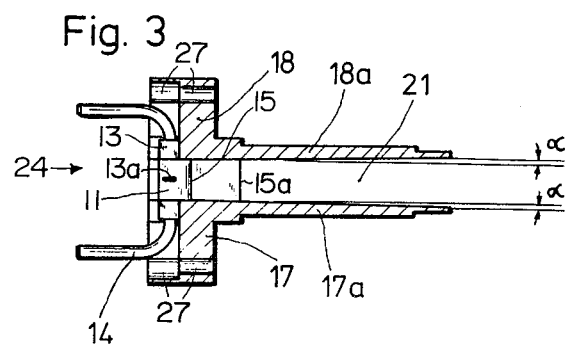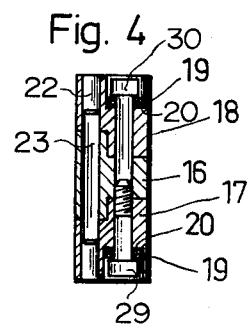
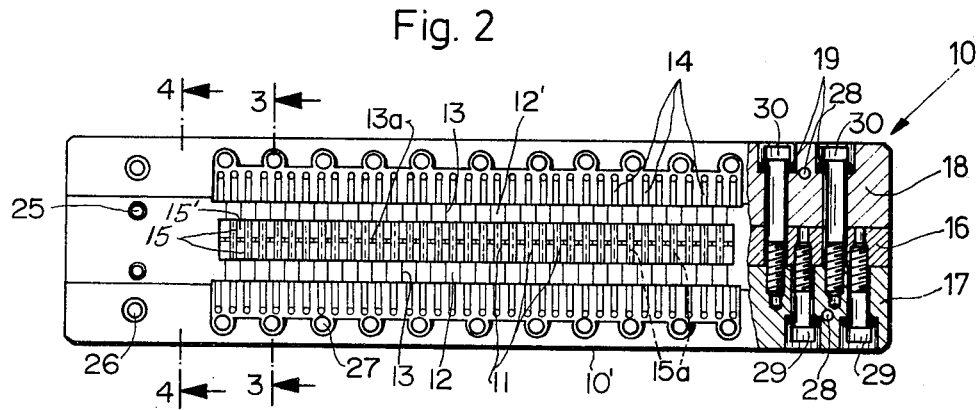

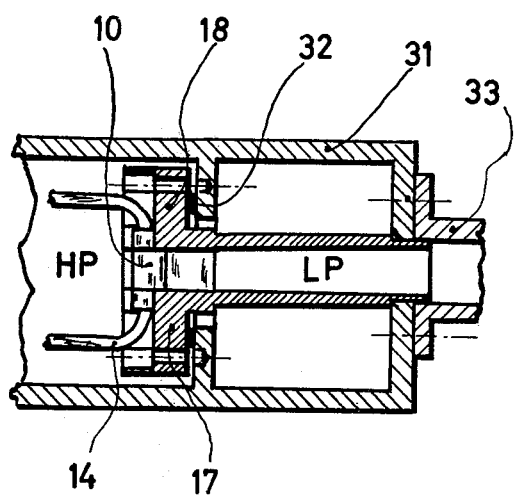

4,257,012

NOZZLE ASSEMBLY FOR GAS-DYNAMIC HIGH EFFICIENCY LASERS

BACKGROUND OF THE INVENTION

The invention relates to a nozzle assembly for gas-dynamic high efficiency lasers with a cooling system. Such lasers may be of the so-called continuous pulse or of the continuous wave type.

Nozzle assemblies which comprise a plurality of individual nozzle members or lamellae are already known as such. Thus, U.S. Pat. No. 3,602,432 discloses a multiple nozzle arrangement for gas-dynamic lasers, wherein the individual nozzle members are arranged one upon the other in the flow canal. The nozzle members are held and fixed by means of setting pins. A cooling system for each individual nozzle member is not provided in U.S. Pat. No. 3,602,432. The disclosed support or holding means and the lack of sufficient cooling in said U.S. Patent do not permit, however, the maintaining of predetermined or optium nozzle contours, especially of the nozzle throat during continuous operation. However, maintaining the nozzle contours is important for assuring a satisfactory inversion in the laser gas and a prerequisite for an optimal parallel flow for producing an optimal laser beam.

A cooling system for a rod-shaped stimulatable solid state laser has been disclosed in German Patent Publication (DAS) No. 2,263,084. The excitation light source of this solid state laser is located in good thermal conducting contact with a cylindrical housing of a concave mirror reflector, which is itself located in a cooling circuit, and wherein the thermal conducting contact comprises a bank of leaf springs. This type of heat dissipation is, however, not usable for gas-dynamic lasers, not to mention the quite considerable weight increase.

A gas dynamic $CO_2$ laser has been disclosed in German Patent Publication (DOS) No. 2,241,428, the expansion device of which comprises a plurality of lamella-like, small Laval nozzles arranged in parallel to each other at a combustion chamber, and the support means of which have cooling canals which are in contact with the cooling canals of the individual lamellae. It has since been found that such a cooling system is not sufficient for a continuous operation of a high efficiency laser, because even a slight temperature rise of the lamellae causes a strong cross sectional change of the nozzle throat. This leads to the formation of varying nozzle canals or channels and hence to a non-parallel gas flow.

OBJECTS OF THE INVENTION

In view of the foregoing, it is the aim of the invention to achieve the following objects singly or in combination:

to provide a laser nozzle arrangement suitable for the continuous operation of high efficiency lasers and which prevents a change in the nozzle geometry or dimensions even at very high temperatures;

to provide a laser nozzle which assure a proper sealing to avoid leakage flows; and to assure a proper separation between the high pressure portion and the low pressure portion of a laser.

SUMMARY OF THE INVENTION

A nozzle assembly according to the invention is constructed, so that each of the specially formed or shaped nozzle members combined in a holding block has, at the gas entry side, matching bodies with glide surfaces, which are in thermal contact with one another and which have a cooling canal system of their own which extends through the matching bodies and through the throat region of the nozzles.

It is now possible as a result of these features of the invention that any remaining thermal expansions of the system may occur without disturbing the surface relationship of the nozzle members, whereby large laser systems may now be constructed. Therefore, a near perfectly constant temperature prevails in and at each individual nozzle member and at the support means of each nozzle member. Hence, a predetermined operational nozzle throat width is kept practically constant in each nozzle member.

The system of the invention is further optimized by arranging the support or holding block of the nozzle members in the high pressure portion of the laser flow and by providing the holding block with end pieces for supporting the nozzle members, which end pieces allow for a longitudinal expansion of the nozzle members cross-wise to the flow direction. Further, the connection to a base plate and to a head molding is elastic due to plate springs and leaf springs arranged cross-wise.

A rather fault free sealing against leakage flows results from these features. In addition, the high pressure section is properly separated from the low pressure section according to the invention.

BRIEF FIGURE DESCRIPTION

In order that the invention may be clearly understood, it will now be described, by way of example, with reference to the accompanying drawings, wherein:

FIG. 1 is a perspective view of a nozzle member according to the invention;

FIG. 2 is a view of a nozzle assembly of the invention, partially in section, wherein a plurality of nozzle members forming a set are combined in the assembly;

FIG. 3 is a sectional view along the plane of section line 3—3 in FIG. 2;

FIG. 4 is a sectional view along the plane of section line 4—4 in FIG. 2; and

FIG. 5 is a schematic laser housing showing the position of the nozzle assembly.

DETAILED DESCRIPTION OF PREFERRED EXAMPLE EMBODIMENTS

FIGS. 2, 3, and 4 illustrate an example embodiment of the nozzle assembly 10 of the present invention comprising a plurality of specially formed and specially constructed nozzle members or so-called nozzle lamellae 11, as shown in the example embodiment of FIG. 1. Substantially, two-dimensional Laval nozzles are produced by these lamellae by arranging an appropriate desired number of nozzle lamellae in series or in a row. The lamellae 11 are provided for this purpose with matching spacer bodies 12 and 12', having contact surfaces 13 on opposite sides, said contact surfaces permitting a gliding movement between adjacent nozzle members. The matching bodies 12 have nozzle forming throat edges 15. Pairs of such edges 15 facing each other with a spacing therebetween define the opening of the nozzle throat 15' proper. The spacer bodies 12, 12' are provided with a coolant bore 14a and with a coolant flow-through tube 14. The bore 14a not only leads from the one matching spacer body 12 to the other matching spacer body 12', but an extension 14b reaches also to the region of the nozzle throat edge 15, in order to maintain a uniform temperature which lies below 400° C., especially in this region where the largest heat develops or occurs. Incidentally, the view of FIG. 2 is in a direction opposite to the flow direction 24 shown in FIG. 3. In other words, in FIG. 2 the flow moves out of the plane of the drawing toward the viewer.

By arranging the nozzle lamellae or members 11 against one another in a row, the matching spacer bodies 12, 12' come into thermal contact with each other and cause, together with the coolant flow, a heat equilibrium or equalization, which leads to a uniform thermal expansion across the whole assembly 10 and thereby to a stabilization of the nozzle openings. Stated differently, the nozzle opening area is maintained constant. In order to optimize the heat equalization, the nozzle lamellae or members 11 are made of a material with good heat conducting and high strength quality, for example, a copper-cobalt-beryllium alloy.

The mounting and construction of the nozzle assembly of the invention is arranged so that the combustion chamber pressure acts upon the mounting block 10' in such a way that all the nozzle lamellae or members 11 including the nozzle members at the end of the assembly, are simultaneously pressed together. For this purpose, the mounting block 10' is housed and secured in the high pressure or combustion section of the laser as shown in FIG. 5, whereby the pressure in the combustion chamber helps tightly holding the nozzle members 11 in the mounting block 10'. Lands 13a intermediate the contact or glide surfaces 13 on both sides of the nozzle member provide a continuous support in the same manner as the bodies 12, 12'. Heretofore, the nozzle means were arranged exactly at the border between the high pressure section and the low pressure section. Contrary thereto, according to the invention the assembly 10 is housed entirely in the high pressure section of the laser. This feature of the invention has the advantage that it provides a much better sealing against leakage flows and to a precise division between the high and low pressure sections.

The mounting block 10' comprises end pieces 16, a base plate 17 and a head molding 18. The end pieces 16 allow a longitudinal expansion cross-wise to the flow direction. Alignment pins 23 inserted in alignment holes 22 make sure that the elements 16, 17, and 18 are properly aligned relative to each other before bolts 29, 30 are tightened. Further, these end pieces 16 are elastically connected to the base plate 17 and to the head molding 18 by means of Belleville springs 19 and leaf springs 20 as shown in FIG. 4. The nozzle lamallae are placed upright in the mounting block 10' and perpendicularly to the gas flow 24 as indicated in FIG. 3 whereby the nozzle throat edges 15 extend vertically. As shown in FIG. 2, each end piece 16 forms one half of a nozzle member for cooperation with the next adjacent full nozzle member 12 to form a full nozzle throat at each end of the assembly.

In order to minimize the surface boundary influence on the flow and in order to satisfactorily guide the flow in parallel paths, the invention provides that the individual lamellae or members 11 widen from the nozzle throat edges 15 outwardly toward the outer nozzle ridge 15a by a given angle $\alpha$. Although this angle is small, it should be slightly less than 1°, it has a surprisingly good effect on the flow characteristics.

To further improve the efficiency of the nozzle assembly of the invention, it is suggested that the nozzle lamellae or members 11 and the coolant canals 14 and 14a are corrosion resistant. This may be accomplished by plating the outer surfaces, e.g., with copper, nickel, or gold.

The base plate 17 and the head molding 18 are provided with respective plate members 17a and 18a extending horizontally ar a right angle to the base plate 17 and the head molding 18.

The nozzle lamellae or members 11 are located between said plate members 17a and 18a forming the so-called resonator canal 21, which opens at the same angle $\alpha$ as the nozzle lamellae or members 11 thereby causing a boundary surface correction.

Referring again to FIG. 2, holes 25, 26, and 27, for example threaded holes, are provided for securing a nozzle assembly 10 in the high pressure section of a laser housing as shown in more detail in FIG. 5. Bores 28 are provided for the proper alignment and positioning of the assembly 10 with its mounting block 10' in the laser housing. Threaded bolts 29 connect the base plate 17 to the end pieces 16. Threaded bolts 30 connect the head molding 18 to the end pieces 16 and to the base plate 17.

According to the invention it is now possible to produce a high efficiency, gas-dynamic laser which even during continuous operation at very high temperatures, does not exhibit any disturbance of the nozzle geometry and does not allow the forming of leakage flow canals.

FIG. 5 shows the embodiment of the assembly 10 in the laser housing, whereby the mounting block for the nozzle elements comprising the components 16, 17, 18 located in the high pressure section HP which is sealed by an annular gasket 32 from the low pressure section LP. The other end of the holding block 10 is connected to the diffuser 33. The combustion chamber 30 and the resonator chamber 31 form one housing on which a diffuser 33 is mounted.

Although the invention has been described with reference to specific example embodiments, it is to be understood, that it is intended to cover all modifications and equivalents within the scope of the appended claims.

What is claimed is:

1. A nozzle assembly for a gas-dynamic, high efficiency, continuously operable laser, comprising nozzle means including a plurality of nozzle members (11), each nozzle member (11) comprising a laser gas input end and a nozzle output end as well as nozzle throat means (15, 15') intermediate said ends, said input end comprising spacer body means (12) including contact surfaces (13) and individual coolant flow means (14, 14a) in each input end of each nozzle member, said coolant flow means including extension means (14b) located in said nozzle members so that coolant may flow substantially along said nozzle throat means (15, 15'), each of said coolant flow means being supplied with fresh coolant independently of the coolant supply to any other coolant flow means of the assembly, and mounting means (16, 17, 18) for holding said plurality of nozzle members (11) as an assembly so that adjacent spacer body means abut each other at said contact surfaces in a heat conducting manner.

2. The nozzle assembly of claim 1, wherein said nozzle members are made of a material having a good heat conductivity.

3. The nozzle assembly of claim 2, wherein said nozzle members are made of an alloy including copper cobalt and beryllium.

4. The nozzle assembly of claim 1, wherein said mounting means comprise end members, a base plate, a head molding and means including spring means for elastically interconnecting said end members to said base plate and to said head molding, said nozzle members being operatively held in position between said end members whereby said spring means permit a longitudinal expansion of said nozzle members.

5. The nozzle assembly of claim 4, wherein said spring means comprise Belleville springs and leaf springs.

6. The nozzle assembly of claim 1, wherein said individual nozzle members are positioned so that the longitudinal axis of each nozzle member extends in parallel to the longitudinal axis of each other nozzle member.

7. The nozzle assembly of claim 1, wherein each nozzle member comprises a nozzle throat edge (15) and an outer nozzle ridge (15a), said nozzle ridge (15a) being longer than said nozzle throat edge (15) whereby the nozzle member widens from the respective nozzle throat edge (15) to the laser gas output end of the nozzle member at said nozzle ridge 15a.

8. The nozzle assembly of claim 7, wherein said widening comprises an angle within the range of about 0.1° to about 1°.

9. The nozzle assembly of claim 1, wherein nozzle members and said coolant flow means are corrosion resistant.

10. The nozzle assembly of claim 1, further comprising housing means including a high pressure flow section, a low pressure flow section, and mounting means for securing said nozzle assembly in said housing means in such a position that said mounting means are located in said high pressure flow section, whereby leakage problems are substantially minimized by the high pressure being effective in assisting the mounting means in sealing said high pressure flow section from said low pressure flow section.

* * * * *